United States Patent [19]

Starr

[11] Patent Number: 5,527,023

[45] Date of Patent: Jun. 18, 1996

[54] ALIGNMENT DEVICE WITH RADIALLY EXPANDABLE TUBE

[75] Inventor: Donald G. Starr, San Pedro, Calif.

[73] Assignee: Monogram Aerospace Fasteners, Los Angeles, Calif.

[21] Appl. No.: 272,265

[22] Filed: Jul. 8, 1994

[51] Int. Cl.⁶ .................................................. B25B 1/20
[52] U.S. Cl. ..................... 269/43; 269/48.1; 279/2.17
[58] Field of Search ................... 269/48.1, 43; 279/2.17; 242/571, 572, 573

[56] References Cited

U.S. PATENT DOCUMENTS

| | | |
|---|---|---|
| 1,418,524 | 6/1922 | Bronson . |
| 2,298,552 | 10/1942 | Du Vall . |
| 3,009,747 | 11/1961 | Pitzer . |
| 3,301,108 | 1/1967 | Heiner . |
| 3,552,258 | 1/1971 | Warner . |
| 3,618,135 | 11/1971 | Weller . |
| 3,655,225 | 4/1972 | Major . |
| 3,863,856 | 2/1975 | Conlon, Jr. . |
| 4,405,075 | 9/1983 | Roddy . |
| 4,720,114 | 1/1988 | Braitmaier et al. ................ 269/48.1 |
| 4,767,125 | 8/1988 | Barry et al. ........................ 269/48.1 |
| 4,959,917 | 10/1990 | Mavrakis et al. . |
| 4,983,105 | 1/1991 | Mims, Sr. . |
| 5,074,536 | 12/1991 | McConkey ......................... 269/48.1 |

FOREIGN PATENT DOCUMENTS

| | | |
|---|---|---|
| 3929931 | 3/1991 | Germany . |
| 0014439 | 1/1984 | Japan . |
| 59-14439 | 1/1984 | Japan ................................. 269/48.1 |
| 1177073 | 3/1984 | U.S.S.R. ............................ 279/2.17 |

OTHER PUBLICATIONS

Monogram Aerospace Fasteners, "Three Dimensional Fasteners", 1992, pp. 7–12.

*Primary Examiner*—Robert C. Watson
*Attorney, Agent, or Firm*—Pretty, Schroeder, Brueggemann & Clark

[57] ABSTRACT

An alignment device with a radially expandable tube for temporary alignment of a plurality of apertured workpieces in which the precise alignment of associated apertures is required. The radially expandable tube extends from the housing, and contains a plurality of bearings, each associated with at least one radially expandable ring. Each bearing has a tapered surface that engages and radially expands its associated ring upon relative movement of the bearing into the ring. The expansion of the rings applies a radially outwardly directed force on the interior surface of the tube.

44 Claims, 2 Drawing Sheets

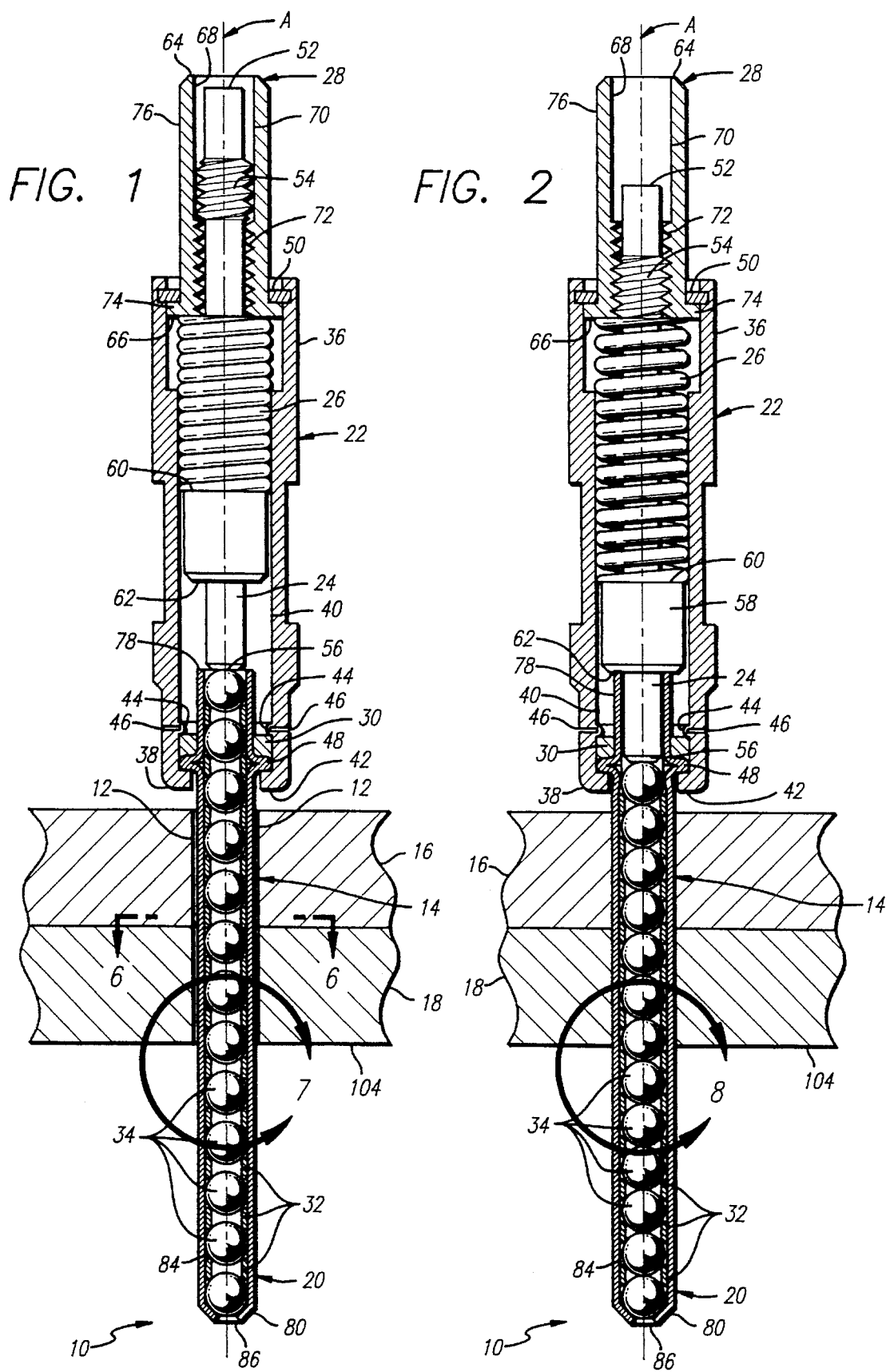

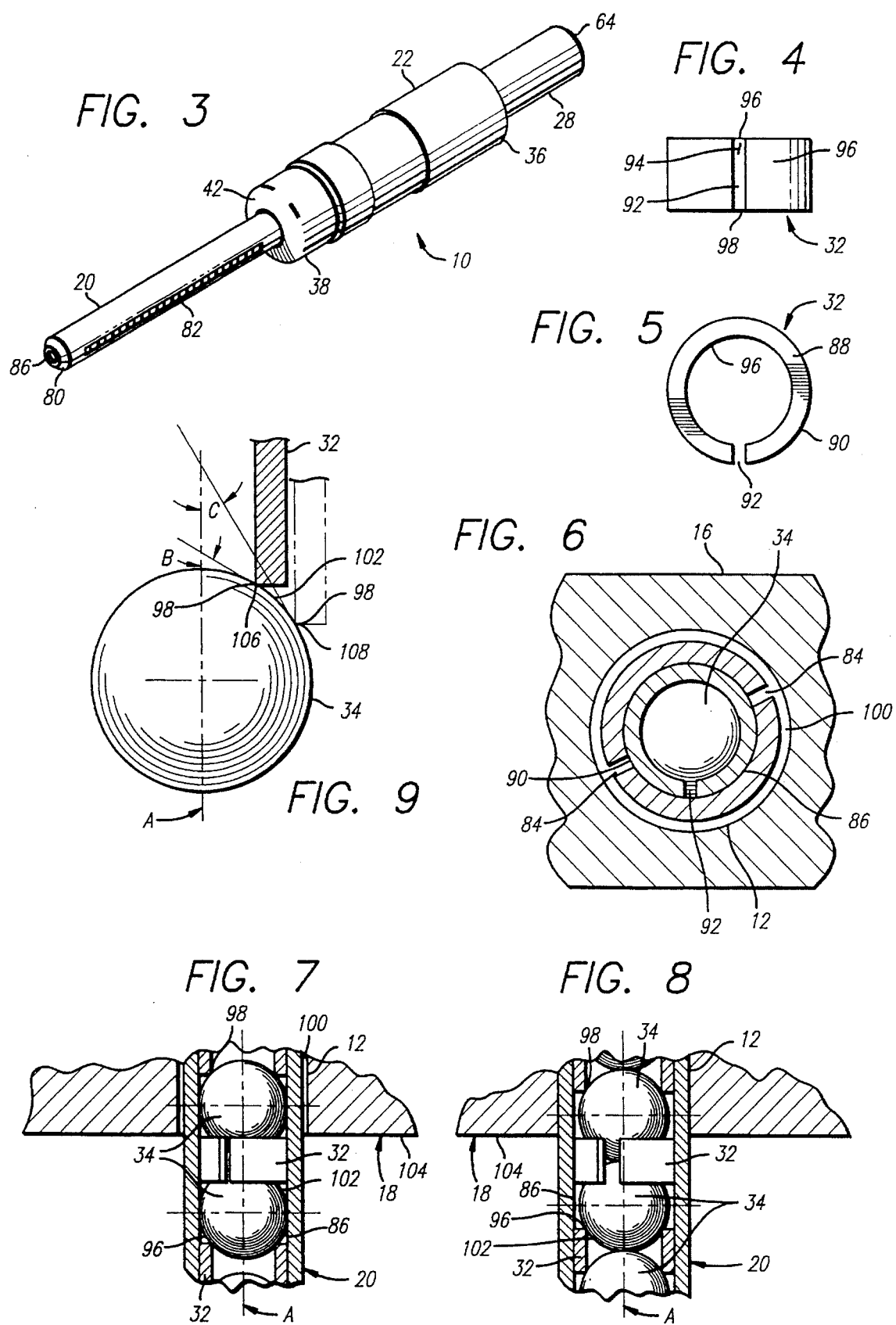

ALIGNMENT DEVICE WITH RADIALLY EXPANDABLE TUBE

BACKGROUND OF THE INVENTION

In general, this invention relates to an alignment device used for temporary alignment of two or more workpieces having holes within them that must be positioned in a precise relationship while some other operation is performed upon the workpieces. More particularly, this invention relates to an alignment device adapted to precisely position two or more workpieces by radially expanding to contact and align the holes' inside surfaces about a single longitudinal axis.

In industry, and in particular, the aerospace industry, it is desirable to have a simple mechanism for temporarily aligning parts in a desirable relationship such that some interim operation such as riveting, can be performed upon the parts. Typical of the situations in which such mechanisms find application is the process of temporarily attaching aircraft skins to each other or to structural members while they are being permanently fastened together to form an assembly.

If the parts to be aligned each have at least one generally cylindrical hole of relatively small diameter, the alignment can be accomplished by means of a device that has a hollow cylindrical body defining a longitudinal axis and an end including a relatively small cylindrical post mounted between two expandable arms having enlarged ends. The arms and the post are generally aligned with the longitudinal axis of the cylindrical body. The arms are connected to a drive nut in the body that, when actuated, causes the arms to longitudinally retract or extend relative to the post.

In operation, the arms are initially extended beyond the end of the post and have a width sufficiently small to enable the arms and the post to be inserted into the workpiece holes. The arms and post are inserted through the holes until the body of the device abuts an outer surface of the outermost workpiece. The drive nut is then rotated, causing the enlarged ends of the arms to move longitudinally toward the post. When the arms contact the post, the arms are forced radially outward as they move toward the inner surface of the innermost workpiece. The rotation of the nut is stopped when the enlarged ends of the radially-expanded arms abut the inner surface of the innermost workpiece. In such a position, the workpieces are compressed between the body of the device and the enlarged ends of the radially-expanded arms. When the interim operations are completed on the workpieces, the device can then be withdrawn by a reversal of the above steps and re-used on other workpieces.

While the prior art discussed above is generally effective in clamping two parts or workpieces together, it does not lend itself well to precisely aligning the holes of the workpieces. More particularly, the radial expansion of the arms of the device causes the arms to have an angled orientation as compared to the cylindrical inner surfaces of the holes. Accordingly, the arms contact only a relatively small portion of the hole in the innermost workpiece, namely that portion of the hole adjacent to the inner surface of the innermost workpiece. Such contact is not sufficient to ensure that the holes of the workpieces are aligned along the same axis to provide a finished assembly with high tolerances now desired by manufacturers. Further, high friction forces can develop between the arms and the holes during retraction of the arms causing the device to stick in its fastened position, thereby requiring the user to forcibly remove the device by other means, such as hammering, which can damage the workpieces.

To remedy these problems, another alignment device was developed to temporarily and precisely align holes within associated workpieces. This device featured cooperating, precisely machined male and female sleeves mounted in a longitudinal series on a pin that has a lower, enlarged end to engage the lowermost sleeve. Both the female and the male sleeves have cam surfaces that interact to expand the female sleeves. The upper end of the pin is mounted to a body that includes a drive cam configured to bear on a thrust washer riding on the uppermost sleeve. The female sleeves are split and the male sleeves move longitudinally to expand the female sleeves in response to compression from the lower end of the pin and the thrust washer.

In operation, this device is initially inserted into two or more workpiece holes. The drive cam is then actuated to move the thrust washer toward the enlarged pin end. Such movement reduces the distance between the thrust washer and the enlarged pin end thereby driving the male sleeves into the female sleeves. The tapered ends of the male sleeves then radially expand the female sleeves to contact and align the inner surfaces of the holes of the workpieces. These steps can be reversed to remove this device from the holes when desired.

While this device is generally effective in aligning holes in workpieces in a precise relationship, the cam surfaces of the male and female sleeves must be precisely toleranced to provide for the uniform expansion of the female sleeves. Accordingly, the male and female sleeves are relatively expensive to manufacture. Further, to avoid their permanent deformation, the expandable female sleeves must be confined to the area within the workpiece holes. As compared to the other confined female sleeves, an exposed female sleeve encounters no resistance and, therefore, can expand to a greater extent in response to the retraction of the enlarged pin end. Such unrestrained expansion can plastically deform the female sleeve, thereby preventing removal and reuse of the device. Accordingly, for each different length of the aligned workpiece holes, a different length device must be purchased, resulting in undesirable costs.

Another drawback of this device is associated with its shorter length when it is expanded. Because the distance between the thrust washer and the enlarged pin end is reduced when the female sleeves are compressed, a possibility exists that a user may mistakenly assume that the device can be used to align holes having a total length of the uncompressed sleeves. Accordingly, the device could be inserted into the holes and then compressed, resulting in the longitudinal withdrawal of the female sleeves from a hole in an innermost workpiece. This innermost workpiece can then be in a nonaligned position during the rest of the process, resulting in undesirable loss of tolerance for the final assembly.

Accordingly, there is a definite need for an expansion pin that does not shorten or permanently deform during use. Further, there also is a definite need for an expansion pin that is relatively simple to manufacture and, therefore, relatively inexpensive.

SUMMARY OF THE INVENTION

The present invention is embodied in a radial expansion pin that does not shorten or permanently deform during use. Further, the expansion pin of the present invention can be relatively simple to manufacture and, therefore, relatively inexpensive.

The present invention relates to an expansion pin that includes a tube mounted to and extending from a housing.

The tube has an interior cylindrical surface and at least one longitudinally extending slot that permits the tube to expand radially upon application of a radially outwardly directed force to the interior surface of the tube.

The expansion pin also includes a plurality of radially expandable rings, each having an exterior surface. The rings are located within the tube so that their exterior surfaces are in an opposed relationship to the interior cylindrical surface of the tube.

The expansion pin also includes a plurality of bearings, each of which is associated with at least one corresponding radially expandable ring. Each bearing has a tapered surface that engages and radially expands its corresponding ring upon relative movement of the bearing into the ring. The bearings and their corresponding rings are relatively movable between a first position, wherein the bearings are adjacent to their corresponding rings, and a second position, wherein the bearings are located sufficiently further into their rings to radially expand the rings. The radially expanded rings apply an increased radially outwardly directed force on the interior cylindrical surface of the tube.

An important advantage of the invention is associated with the length of the tube which remains relatively constant during the setting operation. Unlike the prior art, the tube does not shorten as it expands, thereby increasing the likelihood that the user will correctly extend the tube through and engage the holes to be aligned. Consequently, the holes of the workpieces are more likely to be aligned precisely, resulting in improved tolerances for the finished assembly.

In yet another more detailed aspect of the invention, the spacing of the bearings is selected to cause the bearings to contact each other in the second position and thereby limit the expansion of the tube and the rings. This aspect of the invention provides another important advantage that is associated with the ability of one expansion pin to successfully align holes having varying lengths. Once the bearings contact each other, the rings will not move relative to the bearings to cause further expansion. Accordingly, the tube and rings need not be confined within the workpiece holes to prevent their plastic deformation. Consequently, the tube and the rings can extend through and beyond the holes to be aligned, thereby allowing one expansion pin to be used for varying-length hole alignments and resulting in desirable cost savings.

In a more detailed aspect of the invention, the expansion pin also includes a shaft and a threaded nut. The shaft has an externally threaded portion and is mounted to the housing so that it is moveable into the tube to move the bearings into the second position. The threaded nut engages the threads on the shaft to move the shaft longitudinally upon the rotation of the nut.

In further, more detailed aspects of the invention, the bearings are generally spherical and the rings each have a longitudinal slot extending along their length. An important advantage associated with these aspects is the relatively inexpensive manufacturing cost of the expansion pin. Because of their spherical shape, ball bearings can be used as the spherical bearings. As the ball bearings expand the rings, the rings assume the curvature of the ball bearings. Therefore, the interaction between the rings and the ball bearings is most affected by the tolerances associated with the diameter of the ball bearings and the length and thickness of the rings. Accordingly, because ball bearings are manufactured to high tolerances and can be purchased relatively inexpensively, substantial cost savings may be achieved.

Further, unlike the complex prior art cam surfaces, only the length and the thickness of the rings should be precisely toleranced, thereby allowing the rings to be manufactured relatively inexpensively. Finally, because the tube expands with the rings, the dimensions associated with its expansion are dependent on the tolerances of the rings and the ball bearings. Accordingly, the thickness of the tube can be constructed to a commercial tolerance, resulting in yet another relatively low cost part. In conclusion, these detailed aspects of the expansion pin provide for an advantageously low manufacturing cost.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the invention. In such drawings:

FIG. 1 is a front view, in partial cross-section, of an expansion pin of the present invention, shown in a relaxed position;

FIG. 2 is a front view, in partial cross-section, of the expansion pin of the present invention, shown in an expanded position;

FIG. 3 is a perspective view of the expansion pin shown in FIG. 1;

FIG. 4 is a front view of a split ring from the expansion pin shown in FIG. 1;

FIG. 5 is a top view of the split ring shown in FIG. 4;

FIG. 6 is a cross-sectional view of the expansion pin, taken along lines 6—6 in FIG. 1;

FIG. 7 is a an enlarged view of the expansion pin, taken about circle 7 from FIG. 1; and FIG. 8 is an enlarged view of the expansion pin, taken about circle 8 from FIG. 2.

FIG. 9 is a schematic representation of a partial split ring, shown in cross section, in two positions on an associated ball bearing.

DESCRIPTION OF THE PREFERRED EMBODIMENT

As shown in the exemplary drawings, the present invention is embodied in an expansion pin, generally referred to by the reference numeral 10, for temporarily and precisely aligning two generally cylindrical interior surfaces 12 defining holes 14 having associated longitudinal axes in two abutting workpieces 16 and 18. The expansion pin includes an expansion tube 20 that is placed within the holes and moves between a first, relaxed position and a second, expanded position wherein the tube is radially expanded to precisely align the longitudinal axes of the holes with a longitudinal axis A of the expansion pin.

As shown in FIGS. 1, 2, and 3, the expansion pin 10 includes a housing 22, a shaft 24, a coil spring 26, a nut 28, a ring 30, and the expansion tube 20, which contains split rings 32 and ball bearings 34. The housing has an upper end 36, a lower end 38, and a generally cylindrical interior surface 40 extending between its ends to define a passage having the longitudinal axis A. A first interior circumferential flange 42 and a second interior circumferential flange 44 projects radially inward from the interior surface near the lower end of the housing. The first flange 42 is located on the lower end of the housing. The second flange 44 is located inside the passage at a predetermined longitudinal distance from the first flange. The second flange has an associated circumferential slot 46 that allows the formation of the second flange through a well known longitudinal crimping operation. In order to form the second flange, a housing having a smooth interior surface with an associated slot is longitudinally compressed to shrink the slot longitudinally and cause the material radially inward from the slot to bulge radially inward to form the second flange. Both flanges have an inner diameter greater than the outer diameter of the expansion tube.

The ring 30 is mounted adjacent to the interior surface 40 of the housing 22, longitudinally between the second flange 44 on the housing's lower end 38 and a flange 48 on the expansion tube 20. The ring is sized so that it creates an interference fit between the expansion tube and the housing to resist rotation of the expansion tube with respect to the housing. However, the proper spirit and scope of the invention also includes a ring sized to allow the rotation of the expansion tube, if desired. The ring is preferably made from aluminum, or any other material of suitable strength.

The upper end of the housing also includes a circumferential lock ring 50 that extends radially inward from the interior surface. The housing is preferably made from free machining steel, or any other material of suitable strength. The passage of the body is sized to accommodate the shaft.

The shaft 24 is generally cylindrical and has a longitudinal axis aligned with the longitudinal axis A of the housing 22. An upper end 52 of the shaft has external threads 54 and a lower end 56 of the shaft has a diameter less than that of the expansion tube 20. The shaft also has a stop 58 that extends radially outwardly between its upper end and its lower end. The stop has an upper surface 60 that abuts the coil spring 26 and a lower surface 62 that can abut the open end of the expansion tube when the lower end of the shaft is moved into the expansion tube. Accordingly, the distance between the lower surface of the stop and the lower end of the shaft limits the distance that the lower end of the shaft can extend into the expansion tube. The shaft is preferably made from free machining steel, or any other material of suitable strength.

The nut 28 has an upper end 64, a lower end 66, and an interior cylindrical surface 68. The interior surface of the nut has an upper portion 70 having a diameter greater than that of the shaft's threads 54 and lower circumferential threads 72 sized to engage the threads on the shaft 24. The lower end of the nut has an outwardly extending flange 74 positioned below the lock ring 50 on the upper end 36 of the housing 22 to retain the nut within the housing. The coil spring 26 is located around the shaft 24, between the flange 74 of the nut 28 and the upper surface 60 of the stop 58 on the shaft. The coil spring biases the shaft and the nut threads into engagement.

The nut has a generally cylindrical exterior surface 76 that is intended for engagement with an automated installation and removal tool, such as the Wedgelock Cylindrical Body Driver sold by Monogram Aerospace Fasteners, Inc., of Los Angeles, Calif. In this regard, it should be noted that the exterior surface of the nut can have any shape that facilitates the rotation of the nut by hand or through the use of a tool, such as a wrench. The nut is preferably made from free machining steel, or any other material of suitable strength.

The generally cylindrical expansion tube 20 has an open end 78, a closed end 80, the circumferential flange 48, two longitudinal slots 82, and an interior surface 84 defining a longitudinal axis aligned with longitudinal axis A. The closed end has a small opening 86 sized to retain the ball bearings within the expansion tube. The circumferential flange extends radially outward and is located near the open end of the expansion tube. The expansion tube is mounted in the housing 22 so that its open end is in opposed alignment with the lower end 56 of the shaft 24 and its flange is held between the ring 30 and the first flange 42 on the lower end 38 of the housing.

As shown in FIGS. 3 and 6, the opposed longitudinal slots 82 provide for elastic expansion and contraction of the expansion tube 20 in response to forces applied to the interior surface 84 of the expansion tube by the action of the split rings 32 and the ball bearings 34. The precise interaction of these elements will be described later. The expansion tube is preferably made from high strength steel, or any other material of suitable strength and elastic characteristics.

Regarding the preferred elastic characteristics of the expansion tube 20, to enable the expansion pin 10 to be reused, the stress induced by the strain of maximum diametric expansion should not exceed the elastic limit of the material from which the expansion tube is made. The stress caused by the radial expansion of the tube can be calculated by methods readily known to those skilled in the art.

As shown in FIGS. 4 and 5, each split ring 32 is formed from a "C" shaped wall 88 that has an exterior surface 90, a slot 92, and an interior surface 94 located between two interior end edges 96 and 98. The thickness of the wall is preferably uniform and its curvature defines a longitudinal axis aligned with the longitudinal axis A. The slot extends radially between the interior and exterior surfaces and longitudinally from the upper end to the lower end to form the "C" shape and to allow the split ring to elastically expand and contract in a radial direction. In this regard, it should be understood that, as used throughout this application, the term "ring" includes rings without slots and rings having any number of slots or arcuate segments. Each split ring is preferably made from high strength steel, or any other material of suitable strength and elastic characteristics.

Regarding the preferred elastic characteristics, to enable the split rings 32 to be reused, the stress induced by the strain of maximum diametric expansion should not exceed the elastic limit of the material from which the split ring is made. The stress caused by the radial expansion of the split ring can be calculated by methods readily known to those skilled in the art.

As shown in FIGS. 7 and 8, each split ring is located between two associated ball bearings 34. The center of each ball bearing 34 is generally aligned with the longitudinal axis A of the housing 22. The ball bearings are load bearing members that bear a load created between the lower end 56 of the shaft 24 and the closed end 82 of the expansion tube 20. However, the proper spirit and scope of the invention includes other load bearing members that have curved or tapered surfaces adapted to fit and move within the split rings. Each split ring 32 contacts its associated ball bearings along its interior end edges 96 and 98. The ball bearings are sized to contact each other when the shaft 24 is moved into a position whereby the lower surface 62 of the shaft's stop 58 abuts the open end 78 of the expansion tube. Such sizing limits the movement of the ball bearings in relation to the split rings to assure that the split rings and the expansion tube will not plastically deform and will return to the first, relaxed position when the shaft is retracted from the tube, the details of which will be described later. The ball bearings are preferably made from chromium steel, or any other material of suitable strength.

Now, with respect to FIGS. 1, 6, and 7, the operation of the expansion pin 10 will be described. Prior to the insertion of the expansion pin 10 into the holes 14 are generally, but not precisely, aligned. The expansion pin is then inserted into the holes. As illustrated in FIGS. 1 and 6, the expansion tube is initially in the first relaxed position wherein its diameter is less than the diameters of the holes, resulting in a gap 100 between the expansion tube and the interior surfaces 12 of the holes in the workpieces 16 and 18. Accordingly, as used herein, "relaxed position" refers to a position in which a gap or a loose fit exists between the expansion tube and the interior surfaces of the holes in the workpiece.

Initially, the interior end edges 96 and 98 of each split ring are situated in a first contact position with its associated ball bearings 34. The first contact position is associated with a first diameter, as measured perpendicular to the axis A. To align the longitudinal axes of the holes in the workpieces with the longitudinal axis A, the expansion tube 20 must be radially expanded into its second position.

As shown in FIGS. 2 and 8, the process by which the expansion pin 10 is moved into its expanded position is achieved by rotating the nut 28 so that its threads 72 engage those on the shaft 24. Because the shaft is biased in the downward direction by the spring 26, no movement other than the rotation of the nut is required to engage the nut threads with the shaft threads 54. As the nut rotates, the shaft is driven downward, causing the lower end 56 of the shaft 24 to move longitudinally into the open end 78 of the expansion tube 20 to place a load on the ball bearings 34 and the split rings 32. This loading causes the distance between the ball bearings to decrease, and forces the interior end edges 96 and 98 of each split ring to slide longitudinally and radially outwardly along the curved surfaces 102 of its associated ball bearings to a second contact position with the associated ball bearings. This second contact position is associated with a larger, second diameter, as compared to the diameter of the first contact position and as measured perpendicular to axis A. As the split rings expand, they apply a radially outwardly directed force on the interior surface of the expansion tube, thereby causing the expansion tube to move into its expanded position.

In the expanded position, the expansion tube 20 expands to fill the gap 100 and applies a radially outwardly directed force on the interior surfaces 12 of the holes 14, resulting in the precise alignment of the longitudinal axes of the holes with longitudinal axis A. Also in this expanded position, the ball bearings 34 can come into contact with each other and bear any compressive force in excess of that originally required to move them into contact with each other. However, the contact between the ball bearings is not necessary to expand the tube and align workpiece holes. When the ball bearings contact each other, they will not move relative to the split rings 32 to further expand the split rings. In the expanded position, the lower surface 62 of the stop 58 on the shaft 24 abuts the open end 78 of the expansion tube to prevent the lower end 56 of the shaft 24 from moving further into the expansion tube and applying further load on the ball bearings and the split rings.

After the expansion tube 20 has reached its expanded position, the longitudinal axes of the holes 14 are precisely aligned, resulting in the precise alignment of the workpieces 16 and 18 so that other manufacturing operations can be performed, resulting in a finished assembly that is manufactured to tolerances previously only achievable with the more expensive prior art devices. Upon the conclusion of these manufacturing operations, the expansion pin 10 can be removed and reused on other jobs.

To remove the expansion pin 10, the expansion tube 20 must be moved into its first position. Accordingly, the nut 28 is rotated in an opposite direction to move the lower end 56 of the shaft 24 longitudinally toward the nut. This longitudinal movement causes the distance between the ball bearings 34 to increase, and allows each split ring 32 to slide longitudinally and to spring back radially inwardly along curved surfaces 102 of its associated ball bearings to the first position of contact. Simultaneously, the force from the split rings directed radially outwardly against the interior surface 84 of the expansion tube is reduced, resulting in the radial contraction of the expansion tube into its first contact position. Unlike the conventional devices that clamp the workpieces together between a housing and radially expandable arms, the expansion pin has no engagement with an inner surface 104 of the innermost workpiece 18 and, therefore, is more readily freed from the workpieces 16 and 18 if it becomes stuck in its expanded position, thereby likely resulting in less damage to the workpieces.

To ensure that the split rings 32 are able to repeatedly slide between the first contact position and the second contact position on the curved surfaces 102 of the ball bearings 34, the components of the expansion pin 10 interact in a preferred relationship. When sized to achieve the preferred relationship, the first and second contact positions, representing the relative contact between the interior end edges 96 and 98 of the split rings and the ball bearings, are located on portions of each ball bearing that have enough curvature to facilitate longitudinal as well as radial movement of the split rings in response to the movement of the lower end 56 of the shaft 24. As viewed in cross section, and as schematically illustrated in FIG. 9, the interior end edge 98 of each split ring moves along the curved surface 102 of its associated ball bearing between two points 106 and 108 corresponding to the first and second contact positions, respectively. As measured from a tangent line drawn from the point of contact to the longitudinal axis A, the first contact point 106 is preferably at an angle B less than or equal to approximately 30 degrees and the second contact point is preferably at an angle C greater than or equal to approximately 16 degrees. However, depending on the particular design of the split rings and the load bearing members, other angles may be appropriate and are within the spirit and scope of the invention.

It will, of course, be understood that modifications to the presently preferred embodiment will be apparent to those skilled in the art. Consequently, the scope of the present invention should not be limited by the particular embodiment discussed above, but should be defined only by the claims set forth below and equivalents thereof.

I claim:
1. An expansion pin comprising:
   a housing;
   a tube mounted to and extending from the housing, the tube having an interior cylindrical surface and at least one longitudinally extending slot that permits the tube to expand radially upon application of a radially outwardly directed force to the interior surface of the tube;
   a plurality of radially expandable rings, each having an exterior surface, the plurality of rings located within the tube such that their exterior surfaces are in an opposed relationship to the interior cylindrical surface of the tube;

a plurality of bearings within the tube such that each bearing is associated with at least one corresponding radially expandable ring, each bearing having a tapered surface that engages and radially expands its corresponding ring upon relative movement of the bearing into the ring, the bearings and their corresponding rings being relatively movable between a first position wherein the bearings are adjacent their corresponding rings and a second position wherein the bearings are located sufficiently further into their rings to cause the rings to radially expand and apply an increased radially outwardly directed force on the interior cylindrical surface of the tube.

2. The expansion pin of claim 1, wherein the bearings are generally spherical.

3. The expansion pin of claim 1, wherein the tube further includes a second longitudinally extending slot diametrically opposed to the first slot.

4. The expansion pin of claim 1, wherein the expansion pin further comprises:

a shaft having an externally threaded portion, the shaft mounted to the housing such that it is longitudinally movable into the tube to move the bearings into the second position; and a threaded nut engaging the threads on the shaft to move the shaft longitudinally upon the rotation of the nut.

5. The expansion pin of claim 4, further comprising a spring mounted between the nut and the shaft to bias the shaft and the nut into threaded engagement.

6. The expansion pin of claim 4, wherein the shaft includes a stop that abuts a first end of the tube when the shaft has moved into the tube a predetermined distance.

7. The expansion pin of claim 4, wherein the predetermined distance is that distance necessary to move all of the bearings into initial contact with each other to limit the expansion of the rings and the tube.

8. The expansion pin of claim 2, wherein, in the first position, a tangent line associated with the point of contact between the bearing and associated ring forms an angle with the axis of the ring of approximately 30 degrees and wherein, in the second position, the tangent line forms an angle of approximately 16 degrees.

9. The expansion pin of claim 1, wherein the bearings contact with each other in the second position to limit the expansion of the rings and the tube.

10. The expansion pin of claim 1, wherein each ring is located between two associated bearings.

11. An expansion pin comprising:

a housing;

a tube mounted to and extending from the housing, the tube having an interior cylindrical surface and at least one longitudinal slot that permits the tube to radially expand upon application of a radially outwardly directed force to the interior surface of the tube;

a plurality of rings, each having an exterior surface and at least one longitudinal slot that permits the ring to expand radially from a first position to a second position upon application of a radially outwardly directed force to the rings, the plurality of rings located within the tube such that the exterior surfaces of the rings are in an opposed relationship to the interior cylindrical surface of the tube;

a plurality of bearings within the tube such that each is associated with at least one corresponding ring, each bearing having a tapered surface that engages and radially expands its associated ring upon relative movement of the bearing into the ring, the bearings and their associated rings being relatively movable between a first position wherein the bearings are adjacent their associated rings and a second position wherein the bearings are located sufficiently further into their rings to cause the rings to radially expand and apply an increased radially outwardly directed force on the interior cylindrical surface of the tube.

12. The expansion pin of claim 11, further comprising:

an elongated shaft having a compression end and an externally threaded end, the shaft mounted within the housing such that its compression end is in opposed alignment with the first end of the tube and movable into the tube to move the bearings into the second position; and a threaded nut engaging the threads on the shaft to move the shaft longitudinally upon the rotation of the nut.

13. The expansion pin of claim 12, further comprising a spring mounted between the nut and the surface of the stop on the shaft to bias the shaft and the nut into threaded engagement.

14. The expansion pin of claim 11, wherein the tube further comprises a second longitudinally extending slot diametrically opposed to the first slot.

15. The expansion pin of claim 11, wherein the bearings contact with each other in the second position to limit the expansion of the rings and the tube.

16. The expansion pin of claim 12, wherein the elongated shaft includes a stop that abuts a first end of the tube when the elongated shaft has moved into the tube a predetermined distance.

17. The expansion pin of claim 11, wherein the bearings are generally spherical.

18. The expansion pin of claim 11, wherein, in the first position, a tangent line associated with the point of contact between the bearing and associated ring forms an angle with the axis of the ring of approximately 30 degrees and wherein, in the second position, the tangent line forms an angle of approximately 16 degrees.

19. The expansion pin of claim 11, wherein each ring is located between two associated bearings.

20. An expansion pin comprising:

an elongated, hollow housing having an interior surface defining a longitudinal axis and a longitudinal passage between a first open end and a second open end, the first open end having two longitudinally spaced flanges extending radially inward;

a tube having an interior surface, a closed end, and a flanged first end mounted between the flanges of the first open end of the housing, the tube defining a longitudinal axis and two longitudinal slots that permit the tube to expand radially upon application of a radially outwardly directed force to the interior surface of the tube;

a plurality of rings, each having an exterior surface in opposed alignment within the interior surface of the tube, each of the rings having one longitudinal slot that permits the ring to expand radially from a first position to a second position upon application of a radially outwardly directed force to the of ring, the rings in the second position applying a radially outwardly directed force to the interior surface of the tube;

a plurality of generally spherical bearings, each bearing within the tube longitudinally adjacent an associated two of the rings, each bearing longitudinally insertable into the two associated rings, the bearings and their associated rings being movable relative to each other between a first contact position and a second contact position to move the associated rings between their first and second contact positions wherein the first contact position and the second contact position are relatively defined by angles formed between lines tangent to the surface of the bearings and the longitudinal axis of the tube, the angle being approximately 30 degrees for the first contact position and approximately 16 degrees for the second contact position;

an elongated shaft having a compression end and an externally threaded end, the shaft mounted within the housing such that its compression end is in opposed alignment with the first end of the tube, the compression end moveable into the tube and further including a stop extending radially outwardly, the stop located between the ends of the shaft and having an upper surface and a lower surface, the lower surface of the stop longitudinally spaced from the compression end of the shaft to abut the first end of the expansion tube when the compression end has moved into the tube a predetermined distance to cause the bearings to contact each other;

a lock ring mounted to the second open end of the housing;

a nut having an end mounted within the housing adjacent to the lock ring, and having interior threads for engagement with the threaded end of the shaft into the tube to move the shaft into the tube upon the rotation of the nut;

a spring mounted between the nut and the upper surface of the stop on the shaft to bias the shaft into threaded engagement with the nut; and a ring located between the flanged end of the tube and one of the flanges on the first end of the housing to prevent the rotation of the tube relative to the housing.

21. An expansion pin for engaging a hole in a first workpiece and a hole in a second abutting workpiece, comprising:

a housing;

a tube mounted to and extending from the housing, the tube having an exterior surface, an interior cylindrical surface and at least one longitudinally extending slot that permits the tube to expand radially upon application of a radially outwardly directed force to the interior surface of the tube, the exterior surface of the tube being uniform to continuously engage the abutting workpieces;

a plurality of radially expandable rings, each having an exterior surface, the plurality of rings located within the tube such that their exterior surfaces are in an opposed relationship to the interior cylindrical surface of the tube;

a plurality of bearings within the tube such that each bearing is associated with at least one corresponding radially expandable ring, each bearing having a tapered surface that engages and radially expands its corresponding ring upon relative movement of the bearing into the ring, the bearings and their corresponding rings being relatively movable between a first position wherein the bearings are adjacent their corresponding rings and a second position wherein the bearings are located sufficiently further into their rings to cause the rings to radially expand and apply an increased radially outwardly directed force on the interior cylindrical surface of the tube.

22. The expansion pin of claim 21, wherein the bearings are generally spherical.

23. The expansion pin of claim 21, wherein the tube further includes a second longitudinally extending slot diametrically opposed to the first slot.

24. The expansion pin of claim 21, wherein the expansion pin further comprises:

a shaft having an externally threaded portion, the shaft mounted to the housing such that it is longitudinally movable into the tube to move the bearings into the second position; and a threaded nut engaging the threads on the shaft to move the shaft longitudinally upon the rotation of the nut.

25. The expansion pin of claim 24, further comprising a spring mounted between the nut and the shaft to bias the shaft and the nut into threaded engagement.

26. The expansion pin of claim 24, wherein the shaft includes a stop that abuts a first end of the tube when the shaft has moved into the tube a predetermined distance.

27. The expansion pin of claim 24, wherein the predetermined distance is that distance necessary to move all of the bearings into initial contact with each other to limit the expansion of the rings and the tube.

28. The expansion pin of claim 22, wherein, in the first position, a tangent line associated with the point of contact between the bearing and associated ring forms an angle with the axis of the ring of approximately 30 degrees and wherein, in the second position, the tangent line forms an angle of approximately 16 degrees.

29. The expansion pin of claim 21, wherein the bearings contact with each other in the second position to limit the expansion of the rings and the tube.

30. The expansion pin of claim 21, wherein each ring is located between two associated bearings.

31. The expansion pin of claim 21, wherein the exterior surface of each ring is cylindrical and each ring has a longitudinal slot and an cylindrical interior surface extending between a front end and rear end of the ring, the front and rear ends of the ring defining surfaces perpendicular to the cylindrical interior surface.

32. An expansion pin comprising:

a housing;

a tube mounted to and extending from the housing, the tube having an interior cylindrical surface and at least one longitudinally extending slot that permits the tube to expand radially upon application of a radially outwardly directed force to the interior surface of the tube;

a plurality of radially expandable rings, each having an exterior surface, the plurality of rings located within the tube such that their exterior surfaces are in an opposed relationship to the interior cylindrical surface of the tube;

a plurality of bearings within the tube such that each bearing is associated with at least one corresponding radially expandable ring, each bearing having a tapered surface that engages and radially expands its corresponding ring upon relative movement of the bearing into the ring, the bearings and their corresponding rings being relatively movable between a first position wherein the bearings are adjacent their corresponding rings and a second position wherein the bearings are located sufficiently further into their rings to cause the rings to radially expand and apply an increased radially outwardly directed force on the interior cylindrical surface of the tube; and a shaft mounted to the housing such that it is longitudinally movable relative to the tube to extend therein to move the bearings into the second position.

33. The expansion pin of claim 32, wherein the shaft has an externally threaded portion and further comprising a threaded nut engaging the threads on the shaft to move the shaft longitudinally upon the rotation of the nut.

34. The expansion pin of claim 33, further comprising a spring mounted between the nut and the shaft to bias the shaft and the nut into threaded engagement.

35. The expansion pin of claim 32, wherein the bearings are generally spherical.

36. The expansion pin of claim 32, wherein the tube further includes a second longitudinally extending slot diametrically opposed to the first slot.

37. The expansion pin of claim 32, wherein the shaft includes a stop that abuts a first end of the tube when the shaft has moved into the tube a predetermined distance.

38. The expansion pin of claim 37, wherein the predetermined distance is that distance necessary to move all of the bearings into initial contact with each other to limit the expansion of the rings and the tube.

39. The expansion pin of claim 32, wherein, in the first position, a tangent line associated with the point of contact between the bearing and associated ring forms an angle with the axis of the ring of approximately 30 degrees and wherein, in the second position, the tangent line forms an angle of approximately 16 degrees.

40. The expansion pin of claim 32, wherein the bearings contact with each other in the second position to limit the expansion of the rings and the tube.

41. The expansion pin of claim 32, wherein each ring is located between two associated bearings.

42. The expansion pin of claim 32, wherein the exterior surface of each ring is cylindrical and each ring has a longitudinal slot and a cylindrical interior surface extending between a front end and rear end of the ring, the front and rear ends of the ring defining surfaces perpendicular to the cylindrical interior surface.

43. The expansion pin of claim 1, wherein the exterior surface of each ring is cylindrical and each ring has a longitudinal slot and a cylindrical interior surface extending between a front end and rear end of the ring, the front and rear ends of the ring defining surfaces perpendicular to the cylindrical interior surface.

44. The expansion pin of claim 11, wherein the exterior surface of each ring is cylindrical and each ring has a longitudinal slot and a cylindrical interior surface extending between a front end and rear end of the ring, the front and rear ends of the ring defining surfaces perpendicular to the cylindrical interior surface.

* * * * *